US010458481B2

(12) United States Patent
Li et al.

(10) Patent No.: US 10,458,481 B2
(45) Date of Patent: Oct. 29, 2019

(54) TORQUE-REDUCING SLEEVE FOR A HYDRANT STEM

(71) Applicant: Mueller International, LLC, Atlanta, GA (US)

(72) Inventors: Yanlong Li, Hixson, TN (US); Paul Gifford, Chattanooga, TN (US); Walter Pierce Wojick, Lookout Mountain, GA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/799,131

(22) Filed: Oct. 31, 2017

(65) Prior Publication Data

US 2019/0128335 A1    May 2, 2019

(51) Int. Cl.
| | | |
|---|---|---|
| F16D 9/08 | (2006.01) | |
| E03B 9/04 | (2006.01) | |
| F16D 1/108 | (2006.01) | |
| F16K 31/50 | (2006.01) | |

(52) U.S. Cl.
CPC .......... *F16D 9/08* (2013.01); *E03B 9/04* (2013.01); *F16D 1/108* (2013.01); *F16K 31/508* (2013.01)

(58) Field of Classification Search
CPC ... F16D 9/08; F16D 1/108; E03B 9/04; Y10T 137/5456
See application file for complete search history.

(56) References Cited

U.S. PATENT DOCUMENTS

| | | | | |
|---|---|---|---|---|
| 2,018,455 A | * | 10/1935 | Lofton | E03B 9/02 137/272 |
| 3,002,775 A | * | 10/1961 | Mueller | E03B 9/00 137/68.14 |
| 3,104,554 A | * | 9/1963 | Mueller | E03B 9/02 137/15.02 |
| 3,331,397 A | * | 7/1967 | Mueller | E03B 9/04 137/797 |
| 3,439,947 A | * | 4/1969 | Luckenbill | F16B 7/00 285/4 |
| 3,912,405 A | * | 10/1975 | Katt | E01F 9/635 403/11 |
| 3,961,642 A | * | 6/1976 | Thomas | E03B 9/04 137/272 |
| 4,490,062 A | * | 12/1984 | Chisholm | E04H 12/22 29/897 |

(Continued)

OTHER PUBLICATIONS

Mueller Co.; Brochure for Super Centurion Hydrants; see p. 2; copyright 2015, 6 pgs.

(Continued)

*Primary Examiner* — Eric Keasel
*Assistant Examiner* — Kevin R Barss
(74) *Attorney, Agent, or Firm* — Taylor English Duma LLP

(57) ABSTRACT

A stem coupling for a hydrant includes: an upper portion defining an upper portion length from a center of a plurality of break-away features defined in the stem coupling to a first end of the stem coupling; and a lower portion defining an lower portion length from the center of the plurality of break-away features defined in the stem coupling to a second end of the stem coupling distal from the first end of the stem coupling, the lower portion length equaling at least two times the upper portion length.

30 Claims, 5 Drawing Sheets

(56) References Cited

U.S. PATENT DOCUMENTS

| | | | | | |
|---|---|---|---|---|---|
| 5,020,934 | A | * | 6/1991 | Floren | E03B 9/02 403/2 |
| 5,221,267 | A | * | 6/1993 | Folden | A61M 1/28 285/4 |
| 7,588,049 | B2 | * | 9/2009 | Blyth | E03B 9/04 137/272 |
| 7,753,065 | B1 | * | 7/2010 | Bevins | E03B 9/16 137/1 |
| 9,222,582 | B2 | * | 12/2015 | Gifford | F16K 1/36 |
| 9,458,609 | B2 | * | 10/2016 | Fleury, Jr. | E03B 9/02 |

OTHER PUBLICATIONS

Mueller Co.; Operating Instructions for Mueller Super Centurion Fire Hydrant, Copyright 1999, 12 pgs.

Mueller Safety Stem Coupling: Various views of a safety stem coupling that was publicly available prior to Feb. 8, 2016, 1 pg.

* cited by examiner

TORQUE-REDUCING SLEEVE FOR A HYDRANT STEM

TECHNICAL FIELD

Field of Use

This disclosure relates to hydrants. More specifically, this disclosure relates to stem couplings in a hydrant.

Related Art

A fluid distribution system such as a municipal water system can comprise a hydrant that can permit ready and reliable above-ground access to water by authorized personnel. The hydrant as defined here can be installed partly below and partly above the ground surface and is typically supplied with water by a substantially horizontal pipe connected to the hydrant and sometimes referred to as a "lateral" pipe extending from a "main" water pipe. The bury depth of the hydrant, which can be measured from the ground surface to a lowermost portion of the aforementioned "lateral," can vary greatly.

A stem assembly, typically comprising a lower stem and an upper stem connected to each other with a coupling, can be positioned inside the hydrant and can extend from a top of the hydrant to a main valve near the bottom of the hydrant. The main valve can allow water into or keep water out of the exposed part of the hydrant. During an accident involving damage to the hydrant, the upper stem can be configured to break away from the lower stem along with the portion of the hydrant exposed above ground, thereby allowing an upper portion of the hydrant to separate from a lower portion of the hydrant by a predictable, sacrificial failure of the coupling and other neighboring parts, as may be the case. In some installations, however, including when the bury depth exceeds a certain distance, flex in the stem caused by the extended length of the stem can make opening and closing of the main valve of the hydrant more difficult.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In some aspects, disclosed is a hydrant comprising: a hydrant body defining an internal cavity and a central axis 201, the hydrant body comprising a first constraining portion and a second constraining portion; an upper stem positioned at least partly within the internal cavity, an axis of the upper stem substantially fixed about the central axis 201 at the first constraining portion; a lower stem positioned at least partly within the internal cavity, an axis of the lower stem substantially fixed about the central axis 201 at the second constraining portion; and a stem coupling securing the upper stem to the lower stem, the stem coupling comprising a coupling body defining a main bore extending from a first end of the stem coupling to a second end of the stem coupling, the main bore sized to receive the upper stem and the lower stem, the coupling body defining a plurality of break-away features, the coupling body comprising an upper portion and a lower portion, the upper portion defining an upper portion length from a center of the plurality of break-away features to the first end of the stem coupling and the lower portion defining a lower portion length from the center of the plurality of break-away features to the second end of the stem coupling, the hydrant defining an upper free length from the center of the plurality of break-away features of the stem coupling to the first constraining portion and defining a lower free length from the center of the plurality of break-away features to the second constraining portion, the upper portion length equal to at least 12 percent of the upper free length of the hydrant and the lower portion length equal to at least 10 percent of the lower free length of the hydrant, both the upper stem and the lower stem unsupported between the first constraining portion and the second constraining portion.

In a further aspect, disclosed is a stem coupling for a hydrant, the stem coupling comprising: an upper portion defining an upper portion length from a center of a plurality of break-away features defined in the stem coupling to a first end of the stem coupling; and a lower portion defining an lower portion length from the center of the plurality of break-away features defined in the stem coupling to a second end of the stem coupling distal from the first end of the stem coupling, the lower portion length equaling at least two times the upper portion length.

In yet another aspect, disclosed is a stem coupling for a hydrant, the stem coupling comprising: an upper portion defining an upper portion length from a center of a plurality of break-away features defined in the stem coupling to a first end of the stem coupling; and a lower portion defining an lower portion length from the center of the plurality of break-away features defined in the stem coupling to a second end of the stem coupling distal from the first end of the stem coupling, a one of the lower portion length and the upper portion length equaling at least 3 inches.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
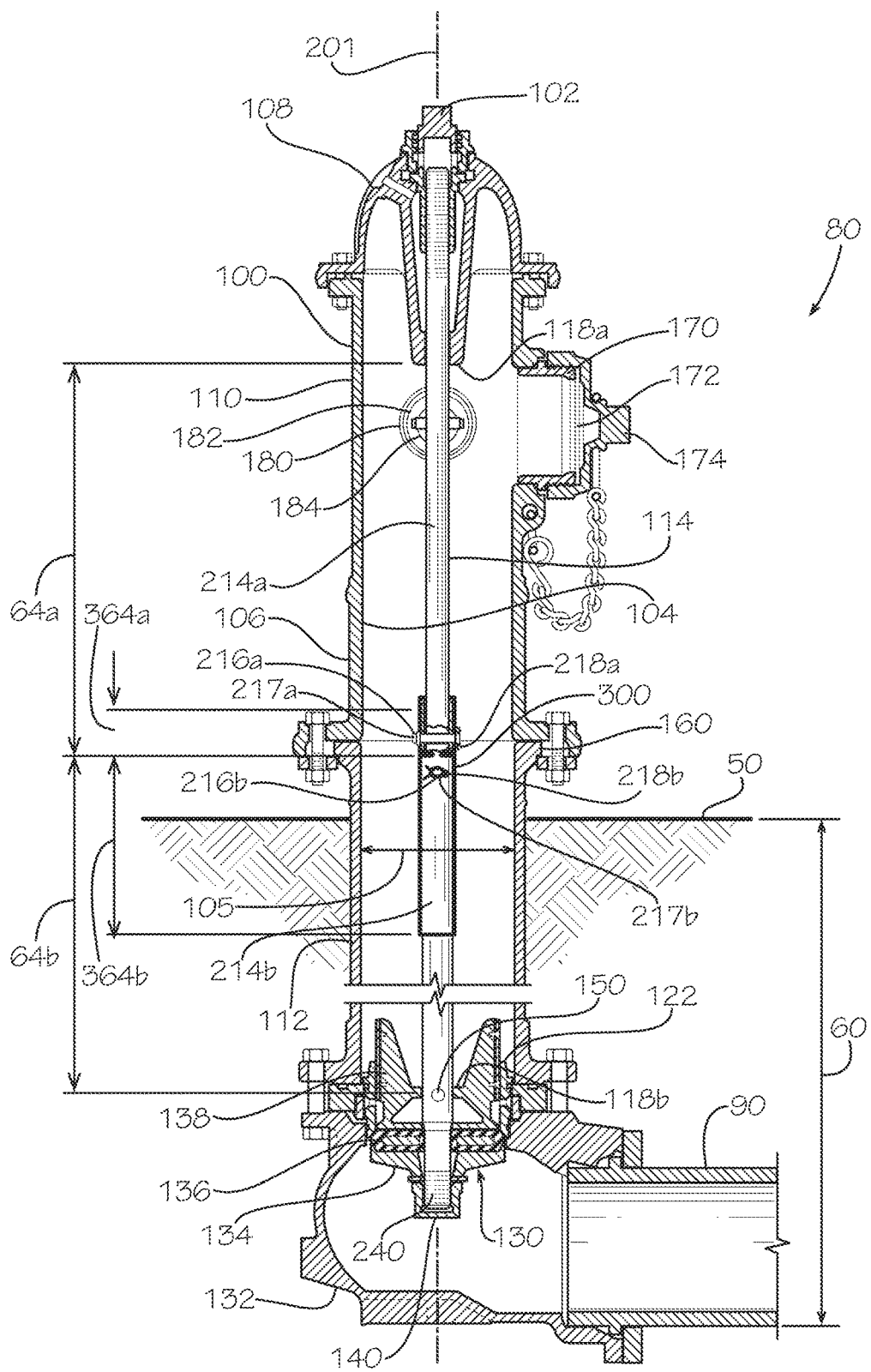
FIG. 1 is a section view of a hydrant installed in the ground in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "upper," "lower," "inside," "outside," "inboard," "outboard," "horizontal," and/or "vertical" may be referenced. Unless stated otherwise, "top" describes that end of the hydrant nearest to a bonnet of the hydrant; and "bottom" is that end of the hydrant that is opposite or distal the top and generally, although not always, located underground. "Horizontal" or "horizontal orientation" describes that which is in a plane extending from left to right and aligned with the horizon. "Vertical" or "vertical orientation" describes that which is in a plane that is angled at 90 degrees to the horizontal.

In some aspects, a stem coupling and associated methods, systems, devices, and various apparatuses are disclosed herein. In some aspects, the stem coupling can comprise a coupling body.

Hydrants, sometimes referred to more specifically as fire hydrants, are typically used in a municipal (or private) water system to dispense water for extinguishing fires and for other purposes. A hydrant, however, can also be used to dispense fluids other than water. Fire hydrants commonly are one of two types: wet-barrel and dry-barrel. In a wet-barrel hydrant, water remains in the hydrant body at all times because the main valve is commonly situated near the top of a body of the hydrant. In a dry-barrel fire hydrant, the main valve is mounted on or housed in a hydrant shoe at a lower end of the hydrant body and the water is drained from the hydrant body when the main valve is closed.

FIG. 1 shows a fluid distribution system 80 comprising a hydrant 100 and a pipe 90, which can be connected to the hydrant 100. The fluid distribution system 80 and the hydrant 100 forming a portion thereof can be installed partly below and partly above the ground surface 50. A bury depth 60 of the hydrant 100 can be measured from the ground surface 50 to a lowermost portion of an end of the pipe 90 proximate to the hydrant 100. In some aspects, the hydrant 100 can be a dry-barrel fire hydrant comprising a hydrant body 106 defining an internal cavity 104 defining an inner diameter 105. In other aspects, the hydrant 100 can be another type of fire hydrant such as, for example and without limitation, a wet-barrel fire hydrant.

The hydrant body 106 can comprise an upper hydrant barrel 110, a bonnet 108 secured to a top end of the upper hydrant barrel 110, and a lower hydrant barrel 112 secured to a bottom end of the upper hydrant barrel 110. The hydrant 100 can further comprise a hydrant shoe 132 secured to a bottom end of the lower hydrant barrel 112. The hydrant shoe 132 can be secured to a water supply pipe such as the pipe 90 or any other fluid supply pipe. An operating nut 102 can be mounted on, in, or through the bonnet 108.

A stem assembly 114 can be secured to the operating nut 102 via a threaded connection and can be positioned within and centered within the internal cavity 104. The stem assembly 114 can comprise an upper stem 214a and a lower stem 214b. The stem assembly 114 can further comprise a stem coupling 300, which can also be called a sleeve coupling or a sleeve. In some aspects, the stem coupling 300 can join the upper stem 214a and the lower stem 214b with a fastener 216a,b, respectively. In some aspects, the fasteners 216a,b can comprise clevis pins 217a,b and cotter pins 218a,b, respectively. In other aspects, the fasteners 216a,b used to secure the upper stem 214a to the lower stem 214b can be another type of fastener such as, for example and without limitation, weldments, screws, or bolts. In other aspects, the stem assembly 114 can be a single unit or component.

In some aspects, each of the upper stem 214a, the lower stem 214b, and the stem coupling 300 can be circular in radial cross-section. Advantages of the upper stem 214a, the lower stem 214b, and the stem coupling 300 being circular in radial cross-section can include 1) a more uniform failure mode regardless of which side of the hydrant 100 is impacted during an accident, 2) more uniform stresses throughout each part, 3) a better strength-to-weight ratio (including torsional stiffness); and 4) the ability to directly form threads on each of the upper stem 214a and the lower stem 214b (for ease of assembly to other portions of the hydrant 100 such as, for example and without limitation, the operating nut 102 or a valve assembly 130).

A valve assembly 130 can be coupled to the lower stem 214b. The valve assembly 130 can comprise a main valve 136, an upper valve plate 138, and a lower valve plate 134. The valve assembly 130 can be coupled to the lower stem 214b by a cap nut 140 and a stem pin 150. The cap nut 140 can be assembled to the lower stem 214b by threading 240, which can be defined in the lower stem 214b. The stem pin 150 can extend through the lower stem 214b and can secure the lower stem 214b to the upper valve plate 138. In some aspects, the main valve 136 and the lower valve plate 134 can thereby be held between the upper valve plate 138 and the cap nut 140. In other aspects, the valve assembly 130 can be mounted to the stem assembly 114 by other methods such as, for example and without limitation, fasteners, brackets, threading, welding, or gluing (e.g., with adhesive) on the upper valve plate 138 or the lower valve plate 134. In other aspects, the lower valve plate 134 can be formed integrally with the stem assembly 114. The hydrant 100 can further comprise a seat ring 122 against which the main valve 136 can seal to close the hydrant, thereby preventing fluid inside the fluid distribution system 80 from flowing from the pipe 90 into the internal cavity 104 of the hydrant body 106.

In some aspects, the upper hydrant barrel 110 can comprise a pumper nozzle 170 defining a pumper nozzle outlet 172 and a hose nozzle 180 defining a hose nozzle outlet 182. The pumper nozzle outlet 172 can be covered by a pumper nozzle cap 174 and the hose nozzle outlet 182 can be covered by a hose nozzle cap 184. The pumper nozzle cap 174 and the hose nozzle cap 184 can be removable for attachment of a pumper and a hose, respectively, to the hydrant 100. The pumper nozzle 170 and the hose nozzle 180 can define a threaded connection, a Storz connection (i.e., a non-threaded quarter-turn connection), or any other connection.

To open the hydrant 100, which can allow water to flow from the pipe 90 into the internal cavity 104 of the hydrant body 106, the operating nut 102 can be turned. Turning the operating nut 102 in one direction can lower the stem assembly 114 and thereby cause the lower valve plate 134 to urge the main valve 136 away from the seat ring 122. To discontinue water flowing from the pipe 90 to the hydrant body 106, the operating nut 102 can be turned in the opposite direction, raising the stem assembly 114 and thereby causing the lower valve plate 134 to urge the main valve 136 towards the seat ring 122 such that the main valve 136 engages the seat ring 122. The hose nozzle outlet 182 and the pumper nozzle outlet 172 can be thereby at least indirectly sealable by the main valve 136.

Also as shown in FIG. 1, the hydrant 100 including the stem assembly 114 can define a first free length 64a—which can be considered an upper free length—from a centerline between the upper stem 214a and the lower stem 214b to a first constraining portion 118a at which point the stem assembly 114 is first constrained above the stem coupling 300 from moving in a horizontal or lateral direction. More specifically, the first constraining portion 118a can be defined by a bonnet 108 of the hydrant 100. Similarly the hydrant 100 including the stem assembly 114 can define a second free length 64b—which can be considered a lower free length—from a centerline between the upper stem 214a and the lower stem 214b to a second constraining portion 118b at which point the stem assembly 114 is first constrained below the stem coupling 300 from moving in the horizontal or lateral direction. More specifically, the second constraining portion 118b can be defined by the valve assembly 130 of the hydrant 100. The stem coupling 300 can define an upper portion length 364a between a center of a below-described weakened portion of the stem coupling 300 and a first end 315 of the stem coupling (shown in FIG. 2). The stem coupling 300 can likewise define a lower portion length 364b between the centerline of the weakened portion of the stem coupling 300 and the second end 316 of the stem coupling 300. The upper stem 214a can be positioned at least partly within the internal cavity 104, and an axis of the upper stem 214a can be substantially fixed about the central axis 201 at the first constraining portion 118a. Likewise, the lower stem 214b can be positioned at least partly within the internal cavity 104, and an axis of the lower stem 214b can be substantially fixed about the central axis 201 at the second constraining portion 118b. By being substantially fixed, either of the upper stem 214a or the lower stem 214b is restricted from movement in a radial direction with respect to the central axis 201 beyond that allowed by the structure of the mating structure (e.g., the bonnet 108 or the valve assembly 130). A small gap between the upper stem 214a or the lower stem 214b and the respective mating structure may be advantageous to permit or optimize rotation of the upper stem 214a or the lower stem 214b. By being completely fixed, either of the upper stem 214a or the lower stem 214b is restricted from any movement in a radial direction with respect to the central axis 201. Both the upper stem 214a and the lower stem 214b can be unsupported between the first constraining portion 118a and the second constraining portion 118b.

Figure 2:
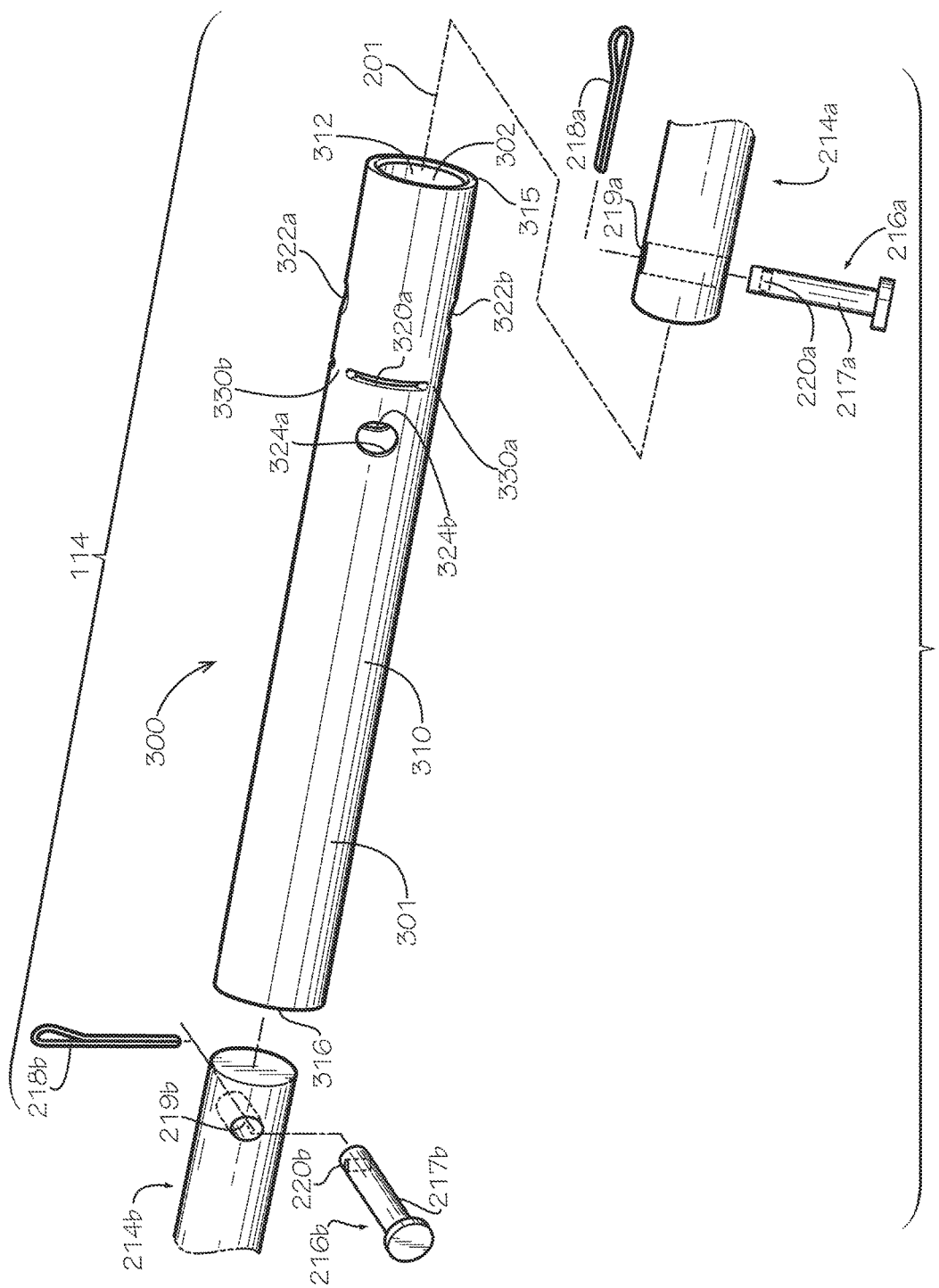
FIG. 2 is an exploded perspective view of an upper stem, a lower stem, and a stem coupling of the hydrant of FIG. 1.

FIG. 2 shows the stem assembly 114, which can comprise the upper stem 214a, the lower stem 214b, and the stem coupling 300. The stem coupling 300 can be aligned and secured or coupled along a central axis 201 to each of the upper stem 214a and the lower stem 214b with the fasteners 216a,b. The stem coupling 300 can comprise a coupling body 310. The coupling body 310 can comprise an exterior surface 301 and an interior surface 302. The interior surface 302 can define a main bore 312 extending from the first end 315 to the second end 316. In some aspects, the main bore 312 can be circular in radial cross-section. In other aspects, the main bore 312 can have a non-circular shape in radial cross-section. The main bore 312 can be sized to receive a portion of the upper stem 214a and a portion of the lower stem 214b. The coupling body 310 can define at least one break-away feature 320a,b,c (320b,c shown in FIG. 5), which can extend from the exterior surface 301 to the interior surface 302. Each pair of adjacent break-away features 320a,b,c can be separated by and defined by conjoining portions 330a,b,c (330c shown in FIG. 5). The break-away features 320a,b,c can together be described as the weakened portion of the stem coupling 300. The coupling body 310 of the stem coupling 300 can further define clearance bores 322a,b and clearance bores 324a,b for respectively receiving the fasteners 216a,b.

The upper stem 214a and the lower stem 214b can respectively define fastener bores 219a,b for receiving the fasteners 216a,b. In some aspects in which the fasteners 216a,b comprise the clevis pins 217a,b, the fastener bores 219a,b can be sized to receive the clevis pins 217a,b. Each of the clevis pins 217a,b can be sized to respectively extend through the fastener bores 219a,b, each of the clevis pins 217a,b extending through one end of the fastener bore 219a of the upper stem 214a and the fastener bore 219b of the lower stem 214b and exiting another end of the respective fastener bores 219a,b of the upper stem 214a and the lower stem 214b. The clevis pins 217a,b can respectively define cotter pin bores 220a,b for receiving the cotter pins 218a,b. The cotter pin bores 220a,b can be sized to receive the cotter pins 218a,b. Each of the cotter pins 218a,b can be sized to extend through one end of the cotter pin bore 220a,b of the clevis pin 217a,b and exit another side of the clevis pin 217a,b. By assembling each of the cotter pins 218a,b to a clevis pin 217a,b through the cotter pin bores 220a,b and bending one or both legs of the cotter pins 218a,b, each of the cotter pins 218a,b can be secured to the clevis pins 217a,b. By securing each of the cotter pins 218a,b to the clevis pins 217a,b after extending the clevis pins 217a,b through the fastener bores 219a,b, the clevis pins 217a,b can be secured to the upper stem 214a and the lower stem 214b, respectively. The stem assembly 114 can be assembled by installing the clevis pins 217a,b through the stem coupling 300, the upper stem 214a, and the lower stem 214b. In other aspects, the fasteners 216a,b can be any one of various types of mechanical fasteners such as, for example and without limitation, pins, screws (including set screws), and bolts. Each of the fasteners 216a,b can be readily removable (i.e., configured to be removable with tools or by hand and without destroying the fastener 216a,b or the parts that it joins).

Figure 3:
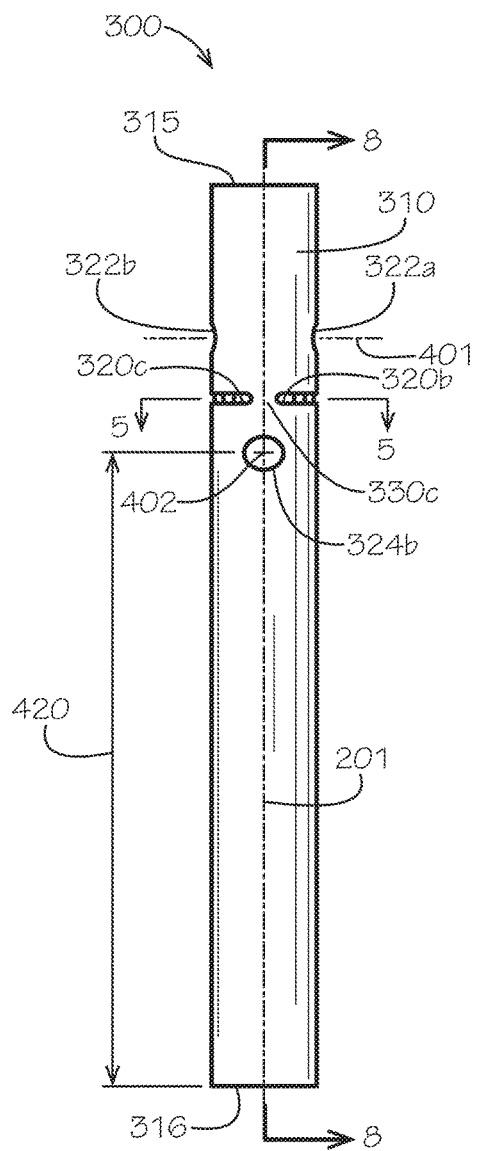
FIG. 3 is a first side view of the stem coupling of FIG. 2.

As shown in FIG. 3, showing a first side view of the stem coupling 300, the coupling body 310 of the stem coupling 300 can comprise the conjoining portions 330a,b,c and define the break-away features 320b,c. As shown, the clearance bores 322a,b can be aligned along a first transverse axis 401 that can be positioned an angular distance 403 (shown in FIG. 6) of 90 degrees with respect to a second transverse axis 402 along which the clearance bores 324a,b are aligned. The clearance bores 322a,b can also be referred to together as a first cross bore 322, and the clearance bores 324a,b can also be referred to together as a second cross bore 324. The first cross bore 322 comprising the clearance bores 322a,b can be positioned between the first end 315 and the break-away features 320a,b,c. The second cross bore 324 comprising the clearance bores 324a,b can be positioned between the second end 316 and the break-away features 320a,b,c. In some aspects, each of the break-away features 320a,b,c can be a break-away slot having a width measured in an axial direction that extends along the central axis 201 of the stem coupling 300 and a length measured in a circumferential direction that wraps around the coupling body 310. Each of the conjoining portions 330a,b,c can also have a width measured in an axial direction that extends along the central axis 201 of the stem coupling 300 and a length measured in a circumferential direction that wraps around the coupling body 310. A first distance 410 (shown in FIG. 4) can be defined between the first transverse axis 401 and the first end 315. Similarly, a second distance 420 can be defined between the second transverse axis 402 and the second end 316.

Figure 4:
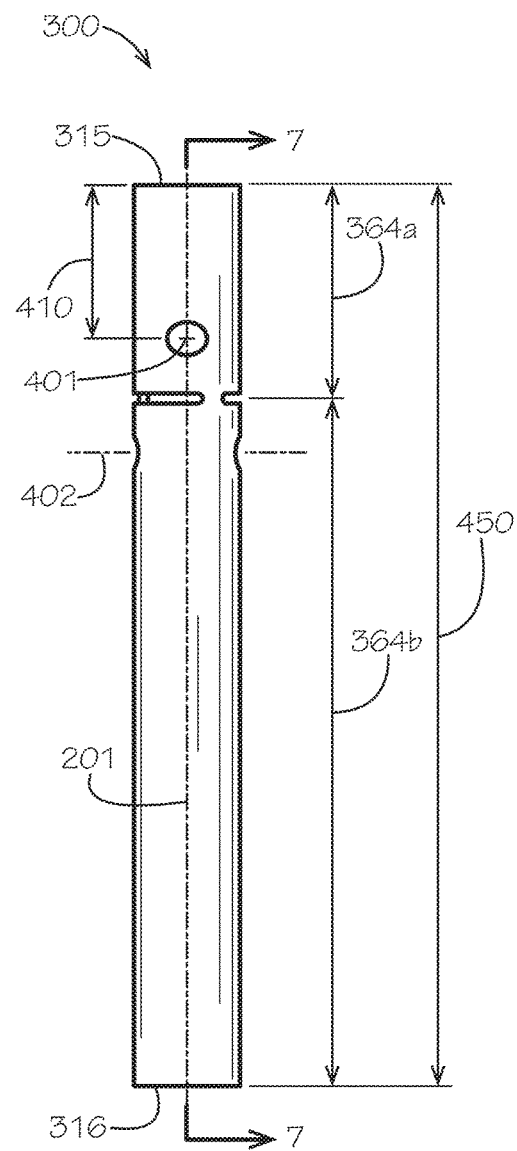
FIG. 4 is a second side view of the stem coupling of FIG. 2, wherein the portion of the stem coupling shown in the second side view and the portion of the stem coupling shown in the first side view are offset 90 degrees from each other.

FIG. 4 shows a second side view of the stem coupling 300 from a position that is offset 90 degrees from the first side view of FIG. 3. In addition to the first distance 410 and the second distance 420, the stem coupling 300 can define the upper portion length 364a and the lower portion length 364b. More specifically, as described above, the stem coupling 300 can define the upper portion length 364a between a centerline of the break-away features 320a,b,c and the first end 315 and the lower portion length 364b between a centerline of the break-away features 320a,b,c and the second end 316. The stem coupling 300 can define an overall length 450.

In some aspects, the upper portion length 364a can be equal to at least 12 percent of the upper free length 64a of the hydrant 100. In other aspects, the upper portion length 364a can be equal to at least 15 percent of the upper free length 64a of the hydrant 100. In other aspects, the upper portion length 364a can be less than 12 percent of the upper free length 64a of the hydrant 100. In some aspects, the lower portion length 364b can be equal to at least 10 percent of the lower free length 64b of the hydrant 100. In other aspects, the lower portion length 364b can be equal to at least 20 percent of the lower free length 64b of the hydrant 100. In other aspects, the lower portion length 364b can be less than 10 percent of the lower free length 64b of the hydrant 100.

In some aspects, the stem coupling can define an overall length equal to at least about 14 inches. In other aspects, the stem coupling can define an overall length equal to at least about 20 inches. In other aspects, the stem coupling can define an overall length equal to less than about 14 inches.

In some aspects, the lower portion length 364b can equal at least two times the upper portion length 364a. In other aspects, the lower portion length 364b can equal at least two and a half times the upper portion length 364a. In other aspects, the lower portion length 364b can equal at least 3.25 times the upper portion length 364a. In other aspects, the lower portion length 364b can equal less than two times the upper portion length 364a.

In some aspects, the lower portion length 364b or the upper portion length 364a can equal at least 3 inches. In other aspects, the lower portion length 364b or the upper portion length 364a can equal at least 10 inches. In other aspects, the lower portion length 364b or the upper portion length 364a can equal at least 15 inches. In other aspects, the lower portion length 364b or the upper portion length 364a can equal less than 3 inches.

Figure 5:
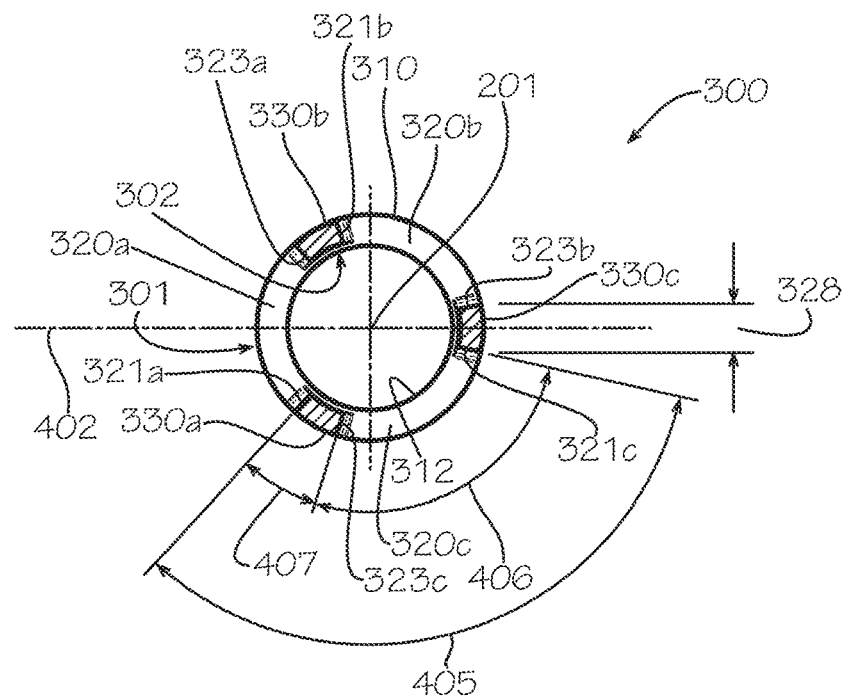
FIG. 5 is a sectional view of the stem coupling of FIG. 2 taken along line 5-5 of FIG. 4.

As shown in FIG. 5, showing a sectional view of the stem coupling 300, the break-away features 320a,b,c can be spaced circumferentially at regular intervals around the coupling body 310. In some aspects, a first end 321a,b,c of each break-away feature 320a,b,c can be spaced away from a second end 323a,b,c of the same break-away feature 320a,b,c by an angular distance 406 of about 95 degrees, and each of the first ends 321a,b,c of the respective break-away features 320a,b,c can be spaced away from the respective second end 323a,b,c of the adjacent break-away feature by an angular distance 407 of about 25 degrees. Each of the conjoining portions 330a,b,c can thereby extend the same angular distance 407 around the coupling body 310 at the thinnest portion of each of the conjoining portions 330a,b,c.

An angular distance 405, a sum of the angular distance 406 and the angular distance 407, can thus total about 120 degrees. In other words, the first end 321a of the break-away feature 320a can be positioned at the angular distance 405 of about 120 degrees behind the first end 321c of the break-away feature 320c, the first end 321c of the break-away feature 320c can be positioned the angular distance 405 of about 120 degrees behind the first end 321b of the break-away feature 320b, and the first end 321b of the break-away feature 320b can be positioned the angular distance 405 of about 120 degrees behind the first end 321a of the break-away feature 320a. The three break away features 320a,b,c and the three conjoining portions 330a,b,c can thus extend a full 360 degrees around the circumference of the coupling body 310. In other aspects, the break-away features 320a,b,c and the three conjoining portions 330a,b,c can be spaced circumferentially at irregular intervals around the coupling body 310. In other aspects, the coupling body 310 can comprise less than three or greater than three of each of the break-away features 320 and the conjoining portions 330 and can likewise result in angular distances 405,406,407 that are less than or greater than the angular distances 405,406,407 shown. In some aspects, the angular distance 407 can be about 20.8% of the angular distance 405. In other aspects, the angular distance 407 can be either more or less than about 20.8% of the angular distance 405. A distance 328 can be measured from each of the first ends 321a,b,c of the respective break-away features 320a,b,c to each of the respective second ends 323a,b,c of the adjacent break-away feature when viewed along the axis 402.

Figure 6:
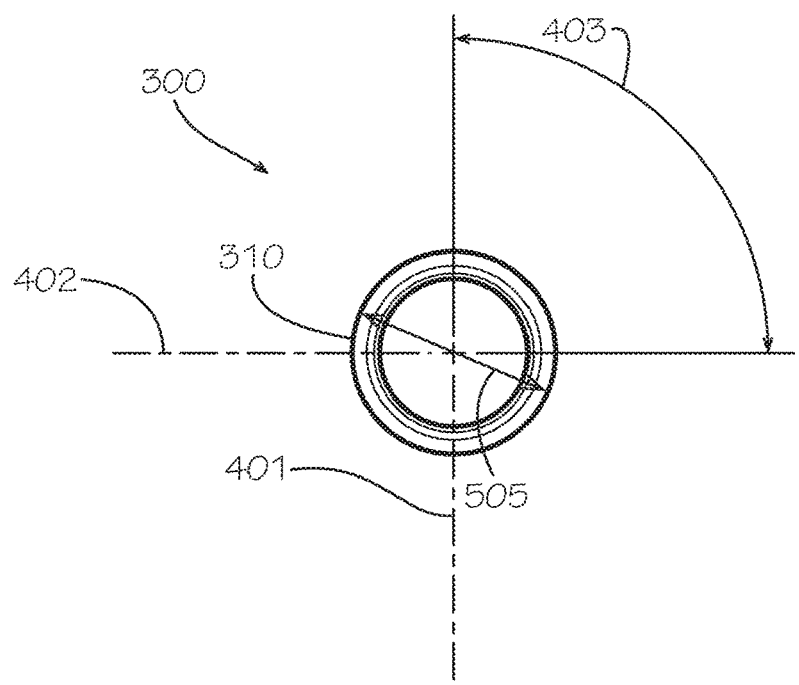
FIG. 6 is a bottom view of the stem coupling of FIG. 2.

As shown in FIG. 6, showing a bottom view of the stem coupling 300, the coupling body 310 can define a body outer diameter 505. FIG. 6 can also represent a top view of the stem coupling 300. As shown, the first transverse axis 401 can be angled with respect to the second transverse axis 402 by an angular distance 403 of about 90 degrees.

Figure 7:
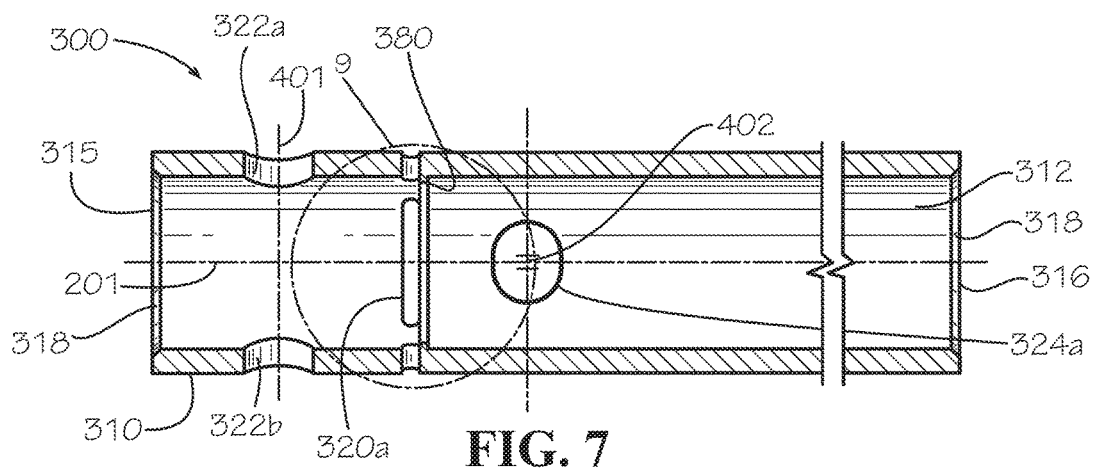
FIG. 7 is a sectional view of the stem coupling of FIG. 2 taken along line 7-7 of FIG. 4.
Figure 8:
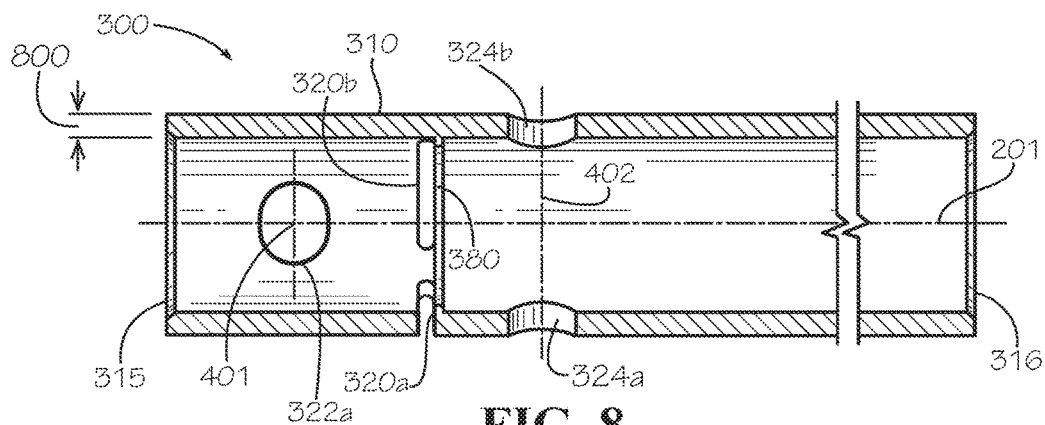
FIG. 8 is a sectional view of the stem coupling of FIG. 2 taken along line 8-8 of FIG. 3.
Figure 9:
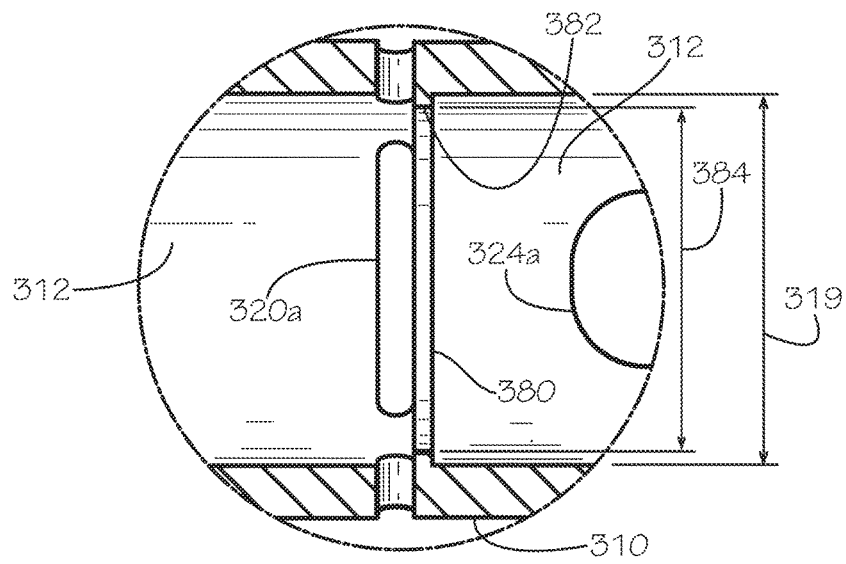
FIG. 9 is a detail view of the stem coupling of FIG. 2 taken from detail 9 of FIG. 7.

FIGS. 7-9 show several axial cross-sections of the stem coupling 300. As shown, the coupling body 310 can further define an internal shoulder 380 extending radially inward from the main bore 312. In some aspects, the coupling body 310 can define a edge relief 318 at the first end 315 and at the second end 316 to ease insertion of the upper stem 214a and the lower stem 214b, respectively. As shown in FIG. 8, the coupling body 310 can define a wall thickness 800.

As shown in FIG. 9, the internal shoulder 380 can define a shoulder bore 382 having a shoulder bore diameter 384. The shoulder bore 382 can have a shoulder bore diameter 384 that is less than an outer diameter of an end of the upper stem 214a that is proximate to the stem coupling 300 and an outer diameter of the lower stem 214b that is proximate to the stem coupling 300. The shoulder bore diameter 384 can be smaller than a main bore diameter 319. In some aspects, due to the presence of the internal shoulder 380, the stem coupling 300 can be configured to slide onto the end of either the upper stem 214a or the lower stem 214b such that each of the upper stem 214a or the lower stem 214b stops against the internal shoulder 380. The stem coupling can thus be configured to not slide past the end of the upper stem 214a or the lower stem 214b. In such aspect, the stem coupling 300 will not be able to accidentally slide up the upper stem 214a or down the lower stem 214b and out of alignment with the fastener bores 219a,b or out of reach of the user of the stem coupling 300. The shoulder bore 382 can be aligned with a central axis 201 of the coupling body 310. In other aspects, the stem coupling 300 need not comprise the internal shoulder 380.

When the bury depth 60 (shown in FIG. 1) of the hydrant 100 equals or exceeds, for example and without limitation, 8 feet 6 inches, or when, for example, the fluid distribution system 80 is prone to vibration or other radially applied loads (i.e., loads such as produced by water hammer conditions that can cause the stem assembly 114 and in particular the lower stem 214b to deflect in a radial direction), flex in the stem assembly 114 or damage to the stem assembly 114 that can be caused by the extended length of the stem assembly 114 can cause problems in the operation of the hydrant 100. More specifically, in some aspects, experience testing and using the hydrant 100 when the bury depth 60 equals or exceeds 8 feet 6 inches shows that extra support (e.g., by installation of the stem coupling 300 disclosed herein) for the stem assembly 114 between the upper constraining portion and the lower constraining portion can be particularly beneficial. In other aspects, the bury depth 60 of the hydrant 100 at which extra support is beneficial can be shallower or deeper depending on such factors as hydrant construction and components and soil quality.

More specifically, the torque required to turn the stem assembly 114 (to open the main valve 136) can increase as the flex or lateral (i.e., horizontal) deformation of the stem assembly 114 increases. The torque can increase because, for example and without limitation, flex of the stem assembly 114 can cause binding of portions of the stem assembly 114 inside the bonnet 108 or proximate to the valve assembly 130. Such binding can cause increased friction resulting in a need for additional torque to open and close the hydrant 100. An increased pressure rating, or at least increased pressure inside the fluid distribution system 80, can increase the torque further because of the greater pressure differential across the main valve 136. Other solutions intended to either directly reduce flex in the stem assembly 114 or to reduce operating torque (without necessarily reducing flex in the stem assembly 114) have been more difficult or more costly to install and remove, can interfere with access to and service of the main valve 136, require the use of designs that are not backwards-compatible, or have not been effective in reducing flex or operating torque or both.

In some aspects, the bury depth 60 can exceed 12 feet. To prevent excessive flex in the stem assembly 114 or damage to the stem assembly 114 and other components of the hydrant 100, the stem coupling 300 can be installed on the stem assembly 114. Because of the increased overall length of the stem coupling 300 and in particular the upper portion length 364a and the lower portion length 364b, the flex in the stem assembly 114 and therefore the operation torque required to open and close the hydrant 100 can be significantly reduced. More specifically, the operation torque can be reduced as much as 5 to 15 foot-pounds or more. One reason for this is an increased moment of inertia along a significantly greater portion of the stem assembly 114. As the moment of inertia increases at any point, the resistance of the shape subject to bending increases.

In some aspects, the hydrant 100 can have a pressure rating of 250 psi. In other aspects, the hydrant 100 can have a pressure rating of at least 350 psi. As the pressure rating increases, including to a pressure rating of 350 psi, minimizing operating torque can be advantageous, especially considering that the hydrant 100 often needs to be opened as quickly as possible in an emergency. While water can be discharged at a higher flow rate from the hydrant 100 at higher pressure ratings, the operating torque can be higher because that higher pressure is acting on the same basic surfaces inside the hydrant (and specifically between the main valve 136 and any mating surfaces). One would not naturally arrive at the current solution of increasing the respective lengths (upper portion, lower portion, and overall) of the stem coupling 300 because of at least the direct increase in the material and fabrication cost of the stem coupling 300 (especially when formed from a more expensive material such as stainless steel) and because in any case the pressure rating that is standard for most hydrants is 250 psi and not 350 psi as the disclosed hydrant 100 is designed to accommodate.

In some aspects, a method of manufacturing the stem coupling 300 can comprise forming the coupling body 310 integrally through a process such as, for example and without limitation, investment casting (sometimes referred to as "lost-wax casting") or injection molding. In other aspects, the stem coupling 300 can be formed by welding or by otherwise joining several components together. In other aspects, the stem coupling 300 can be fabricated from one or more sections of rigid tubing or pipe material, which can define the overall length 450 (shown in FIG. 4). In some aspects, an outer circumference of the exterior surface 301 of the coupling body 310 can be pushed radially inward by a crimping or staking or swaging process to form the internal shoulder 380 (shown in FIG. 9). In other aspects, a section of the coupling body 310 can be bent inward to form the internal shoulder 380, at which time, for example and without limitation, the break-away features 320*a,b,c* can be simultaneously formed. In some aspects, the body outer diameter 505 (shown in FIG. 6) can thus be reduced at the location of the internal shoulder 380. In other aspects, the exterior surface 301 of the coupling body 310 can be pushed radially inward at one or more locations around the circumference of the coupling body 310 without reducing the body outer diameter 505. Thus the internal should 380 need not be continuous and need not be shaped as shown.

In some aspects, the stem coupling 300 can comprise or be formed from stainless steel for its corrosion resistance and strength properties. In other aspects, the stem coupling 300 can comprise or be formed from a non-stainless material such as, for example and without limitation, non-stainless steel (such as carbon steel), fiber-reinforced plastic, or any other material having desirable qualities.

In some aspects, the wall thickness 800 of the stem coupling 300 can be between about 4 millimeters and about 5 millimeters. In other aspects, the wall thickness 800 can be less than or more than this range. In yet other aspects, the wall thickness 800 can be about 4.5 millimeters.

In some aspects, a method of installing the stem coupling 300 can comprise attaching a one of the upper stem 214*a* and the lower stem 214*b* to the stem coupling 300 at the first end 315 and attaching a one of the upper stem 214*a* and the lower stem 214*b* to the stem coupling 300 at the second end 316. In other aspects, the method of installing the stem coupling 300 can comprise removing the stem coupling 300 and installing a second stem coupling 300 in place of the original stem coupling 300.

The stem coupling 300 can be retrofitted on older hydrants. In some aspects, a single stem coupling 300 can be installed on the hydrant 100. In other aspects, more than one of the stem coupling 300 can be installed on the hydrant 100.

In some aspects, a method of servicing the hydrant can comprise removing the stem coupling 300, repairing the hydrant 100, and replacing the stem coupling 300. Repairing the hydrant 100 can comprise, for example and without limitation, servicing or replacing the main valve 136.

As shown in the structure of FIG. 1, the stem coupling 300 can be made immediately accessible after removal of the upper hydrant barrel 110 by placement of the joint between the upper stem 214*a* and the lower stem 214*b* close to a traffic flange 160. After removing the stem coupling 300, service personnel can easily access and service the main valve 136 as needed, including with a seat wrench as needed. In addition to joining the upper stem 214*a* to the lower stem 214*b*, the stem coupling 300 can fail predictably and sacrificially such as when an errantly driven motor vehicle exits the road and impacts the hydrant 100 during a traffic accident. In such an event, a portion of the stem coupling 300 proximate to the first end 315 can remain attached to the upper stem 214*a* and a portion of the stem coupling 300 proximate to the second end 316 can remain attached to the lower stem 214*b*, the stem coupling 300 having torn or sheared into two separate portions due to the break-away features 320*a,b,c* incorporated into the stem coupling 300. Placement of the stem coupling 300 and the joint between the upper stem 214*a* and the lower stem 214*b* slightly below the traffic flange 160 can prevent unintended opening of the hydrant 100 (due to, for example and without limitation, the weight of the motor vehicle resting on the top of the hydrant 100 proximate to the traffic flange 160), even after the upper hydrant barrel 110 and the upper stem 214*a* and other portions of the hydrant 100 have been torn away from the remaining portion of the hydrant 100.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant system comprising:
  a hydrant body defining an internal cavity and a central axis, the hydrant body comprising a first constraining portion and a second constraining portion, the hydrant installed and configured to be installed at a bury depth of at least 8 feet 6 inches;

an upper stem positioned at least partly within the internal cavity, an axis of the upper stem substantially fixed about the central axis at the first constraining portion;

a lower stem positioned at least partly within the internal cavity, an axis of the lower stem substantially fixed about the central axis at the second constraining portion; and a stem coupling securing the upper stem to the lower stem, the stem coupling comprising a coupling body defining a main bore extending from a first end of the stem coupling to a second end of the stem coupling, the main bore sized to receive the upper stem and the lower stem, the coupling body defining a plurality of break-away features, the coupling body comprising an upper portion and a lower portion, the upper portion defining an upper portion length from a center of the plurality of break-away features to the first end of the stem coupling and the lower portion defining a lower portion length from the center of the plurality of break-away features to the second end of the stem coupling, the coupling body defining an internal shoulder proximate to an intersection of the upper portion and the lower portion, the internal shoulder defining a shoulder bore defining a shoulder bore diameter, the shoulder bore diameter being less than an outer diameter of an end of the lower stem that is proximate to the stem coupling, the hydrant defining an upper free length from the center of the plurality of break-away features of the stem coupling to the first constraining portion and defining a lower free length from the center of the plurality of break-away features to the second constraining portion, the upper portion length equal to at least 12 percent of the upper free length of the hydrant but no greater than the upper free length of the hydrant and the lower portion length equal to at least 10 percent of the lower free length of the hydrant but no greater than the lower free length of the hydrant, both the upper stem and the lower stem unsupported between the first constraining portion and the second constraining portion.

2. The system of claim 1, wherein the stem coupling defines an overall length equal to at least 14 inches.

3. The system of claim 2, wherein the overall length is equal to at least 20 inches.

4. The system of claim 1, wherein the main bore is circular in radial cross-section.

5. The system of claim 1, wherein the first constraining portion is defined by a bonnet of the hydrant.

6. The system of claim 1, wherein the second constraining portion is defined by a valve assembly of the hydrant.

7. The system of claim 1, wherein the hydrant is a dry barrel hydrant.

8. The system of claim 1, wherein a working pressure of the hydrant is at least 350 psi.

9. A stem coupling for a hydrant, the stem coupling comprising:

an upper portion defining an upper portion length from a center of a plurality of break-away features defined in the stem coupling to a first end of the stem coupling and a first distance between the first end of the stem coupling and a first transverse axis defined by a center of a first clearance hole configured to receive a first fastener for securing the upper portion of the stem coupling to an upper stem of the hydrant;

a lower portion defining a lower portion length from the center of the plurality of break-away features defined in the stem coupling to a second end of the stem coupling distal from the first end of the stem coupling and a second distance between the second end of the stem coupling and a second transverse axis defined by a center of a second clearance hole configured to receive a second fastener for securing the lower portion of the stem coupling to a lower stem of the hydrant, the lower portion length equaling at least three times the upper portion length but no greater than a lower free length of the hydrant, the second distance also greater than the first distance; and an internal shoulder proximate to an intersection of the upper portion and the lower portion, the internal shoulder defining a shoulder bore defining a shoulder bore diameter, the shoulder bore diameter being less than a main bore diameter of the stem coupling.

10. The stem coupling of claim 9, wherein the lower portion length equals at least two and a half times the upper portion length.

11. The stem coupling of claim 9, wherein the lower portion length equals at least three times the upper portion length.

12. The stem coupling of claim 9, wherein the lower portion length equals 3.25 times the upper portion length.

13. The stem coupling of claim 9, further comprising a first fastener configured to connect an upper stem of a stem assembly of the hydrant to the stem coupling and a second fastener configured to connect a lower stem of the stem assembly of the hydrant to the stem coupling.

14. The stem coupling of claim 13, wherein each of the first fastener and the second fastener comprises a pin.

15. A stem coupling for a hydrant, the stem coupling comprising:

an upper portion defining an upper portion length from a center of a plurality of break-away features defined in the stem coupling to a first end of the stem coupling;

a lower portion defining a lower portion length from the center of the plurality of break-away features defined in the stem coupling to a second end of the stem coupling distal from the first end of the stem coupling, the lower portion length equaling at least 10 inches but no greater than the lower free length of the hydrant; and an internal shoulder proximate to an intersection of the upper portion and the lower portion, the internal shoulder defining a shoulder bore defining a shoulder bore diameter, the shoulder bore diameter being less than a main bore diameter of the stem coupling.

16. The stem coupling of claim 15, wherein the lower portion length equals at least 10 inches.

17. The stem coupling of claim 15, wherein the lower portion length equals at least 15 inches.

18. The stem coupling of claim 15, wherein a thickness of the stem coupling is between 4 millimeters and 5 millimeters.

19. The stem coupling of claim 15, further comprising a coupling body comprising the upper portion and the lower portion, the coupling body defining an internal shoulder extending radially inward from a main bore extending from the first end to the second end of the stem coupling, the internal shoulder defining a shoulder bore.

20. The stem coupling of claim 19, wherein the shoulder bore has an internal diameter that is less than an outer diameter of an end of an upper stem of a stem assembly of the hydrant that is proximate to the stem coupling and an outer diameter of a lower stem of a stem assembly of the hydrant that is proximate to the stem coupling.

21. A hydrant system comprising:
a hydrant body defining an internal cavity and a central axis, the hydrant body comprising a first constraining portion and a second constraining portion;
an upper stem positioned at least partly within the internal cavity, an axis of the upper stem substantially fixed about the central axis at the first constraining portion;
a lower stem positioned at least partly within the internal cavity, an axis of the lower stem substantially fixed about the central axis at the second constraining portion; and
a stem coupling securing the upper stem to the lower stem, the stem coupling comprising a coupling body defining a main bore extending from a first end of the stem coupling to a second end of the stem coupling, the main bore sized to receive the upper stem and the lower stem, the coupling body defining a plurality of break-away features, the coupling body comprising an upper portion and a lower portion, the upper portion defining an upper portion length from a center of the plurality of break-away features to the first end of the stem coupling and the lower portion defining a lower portion length from the center of the plurality of break-away features to the second end of the stem coupling, the coupling body defining an internal shoulder proximate to an intersection of the upper portion and the lower portion, the internal shoulder extending radially inward from the main bore, the internal shoulder configured to prevent passage of the stem coupling completely over the lower stem, the lower stem not able to extend through and past the internal shoulder, the hydrant defining an upper free length from the center of the plurality of break-away features of the stem coupling to the first constraining portion and defining a lower free length from the center of the plurality of break-away features to the second constraining portion, the upper portion length equal to at least 12 percent of the upper free length of the hydrant but no greater than the upper free length of the hydrant and the lower portion length equal to at least 10 percent of the lower free length of the hydrant but no greater than the lower free length of the hydrant, both the upper stem and the lower stem unsupported between the first constraining portion and the second constraining portion.

22. The system of claim 21, wherein the stem coupling defines an overall length equal to at least 14 inches.

23. The system of claim 21, wherein the hydrant is installed and configured to be installed at a bury depth of at least 8 feet 6 inches.

24. The system of claim 21, wherein a working pressure of the hydrant is at least 350 psi.

25. The system of claim 21, wherein the internal shoulder is continuous, the internal shoulder defining a shoulder bore defining a shoulder bore diameter, the shoulder bore diameter being less than an outer diameter of an end of the lower stem that is proximate to the stem coupling.

26. The system of claim 21, wherein the internal shoulder is immediately adjacent to the plurality of break-away features.

27. A stem coupling for a hydrant, the stem coupling comprising:
an upper portion defining an upper portion length from a center of a plurality of break-away features defined in the stem coupling to a first end of the stem coupling and a first distance between the first end of the stem coupling and a first transverse axis defined by a center of a first clearance hole configured to receive a first fastener for securing the upper portion of the stem coupling to an upper stem of the hydrant;
a lower portion defining an lower portion length from the center of the plurality of break-away features defined in the stem coupling to a second end of the stem coupling distal from the first end of the stem coupling and a second distance between the second end of the stem coupling and a second transverse axis defined by a center of a second clearance hole configured to receive a second fastener for securing the lower portion of the stem coupling to a lower stem of the hydrant, the lower portion length equaling at least three times the upper portion length but no greater than a lower free length of the hydrant, the second distance also greater than the first distance; and
an internal shoulder proximate to an intersection of the upper portion and the lower portion, the internal shoulder extending radially inward from a main bore extending from the first end to the second end of the stem coupling, an opening defined by the internal shoulder measuring less than a main bore diameter of the stem coupling.

28. The stem coupling of claim 27, wherein the lower portion length equals at least two and a half times the upper portion length.

29. A stem coupling for a hydrant, the stem coupling comprising:
an upper portion defining an upper portion length from a center of a plurality of break-away features defined in the stem coupling to a first end of the stem coupling;
a lower portion defining a lower portion length from the center of the plurality of break-away features defined in the stem coupling to a second end of the stem coupling distal from the first end of the stem coupling, the lower portion length equaling at least 10 inches but no greater than the lower free length of the hydrant; and
an internal shoulder proximate to an intersection of the upper portion and the lower portion, the internal shoulder extending radially inward from a main bore extending from the first end to the second end of the stem coupling, an opening defined by the internal shoulder measuring less than a main bore diameter of the stem coupling.

30. The stem coupling of claim 29, wherein the internal shoulder is not continuous.

* * * * *